(12) United States Patent
Litwin et al.

(10) Patent No.: US 8,025,030 B1
(45) Date of Patent: Sep. 27, 2011

(54) BIRD FEEDER APPARATUS

(76) Inventors: Thomas E. Litwin, Ridgefield, CT (US); Fred W. Litwin, Brookfield, CT (US)

( * ) Notice: Subject to any disclaimer, the term of this patent is extended or adjusted under 35 U.S.C. 154(b) by 102 days.

(21) Appl. No.: 12/657,957

(22) Filed: Feb. 1, 2010

(51) Int. Cl.
*A01K 39/01* (2006.01)
(52) U.S. Cl. ..................... 119/57.8; 119/52.2
(58) Field of Classification Search ........... 119/429, 119/52.2, 57.8, 57.9, 57.91, 51.01, 52.1, 119/53, 72
See application file for complete search history.

(56) References Cited

U.S. PATENT DOCUMENTS

| | | | | |
|---|---|---|---|---|
| 5,063,877 A | * | 11/1991 | Riggi | 119/52.2 |
| 5,682,835 A | * | 11/1997 | Walter et al. | 119/57.8 |
| 7,237,507 B1 | * | 7/2007 | Colwell | 119/51.01 |

* cited by examiner

*Primary Examiner* — Son T Nguyen
*Assistant Examiner* — Thien Thanh Pham
(74) *Attorney, Agent, or Firm* — Norman B. Rainer

(57) ABSTRACT

A bird feeder designed for overhead positioning is provided having a dispensing component which protectively holds and controllably dispenses particulate bird feed, and a refilling component liftable by an elongated staff and configured to add bird feed to the dispensing component.

10 Claims, 3 Drawing Sheets

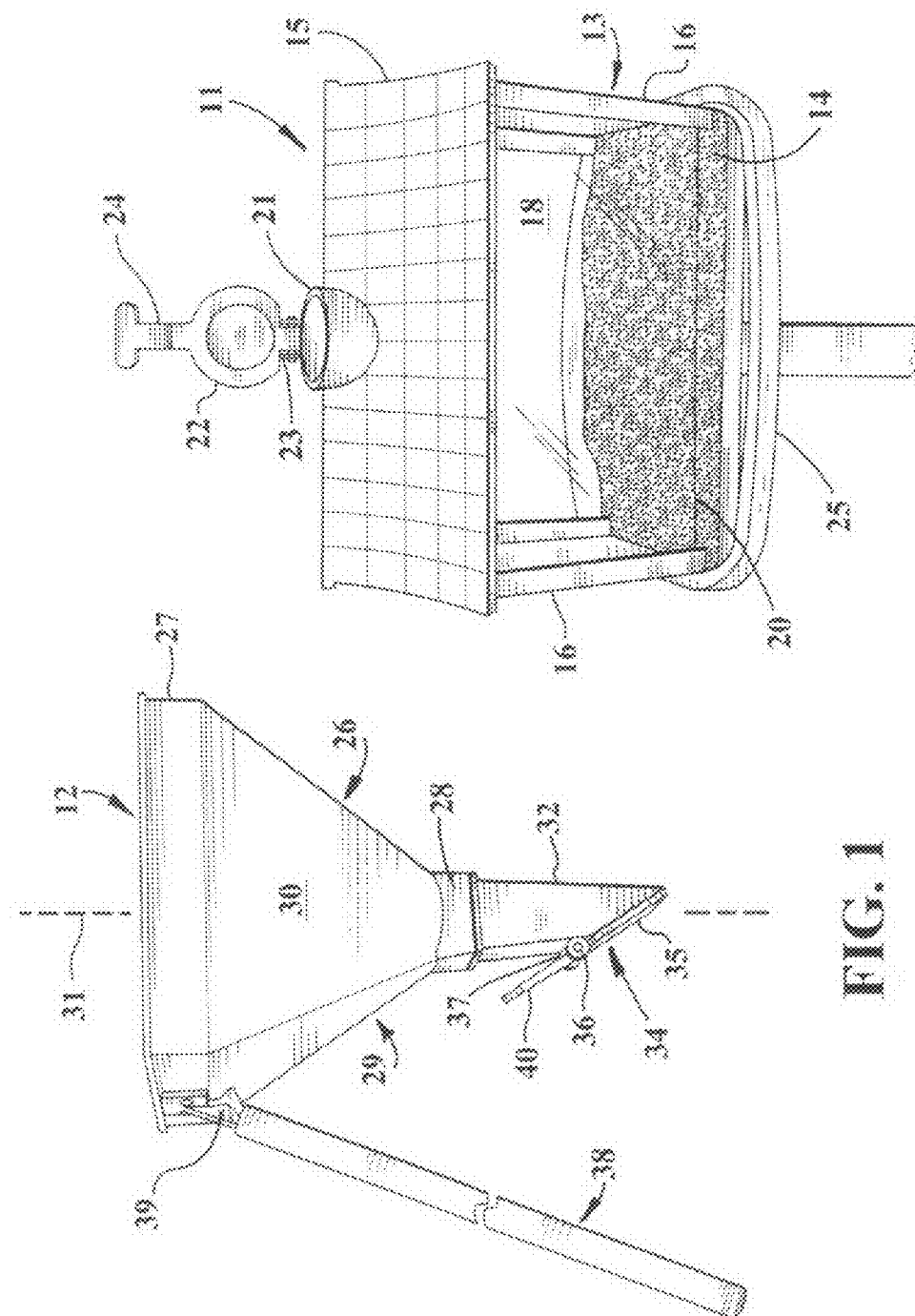

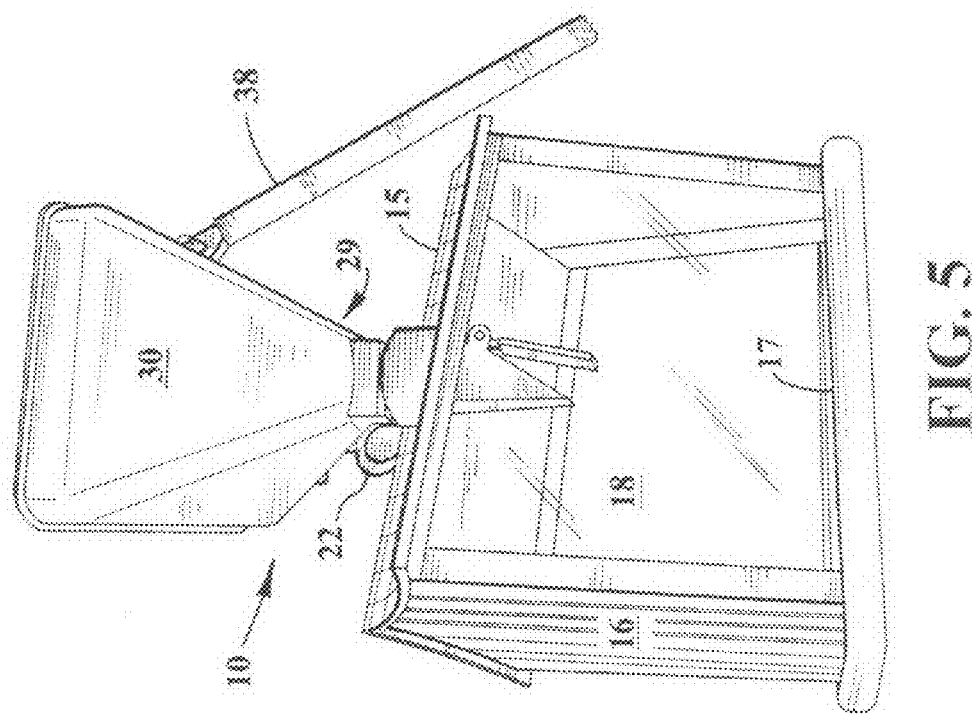

BIRD FEEDER APPARATUS

BACKGROUND OF THE INVENTION

1. Field of the Invention

This invention relates to bird feeding devices, and more particularly relates to the re-filling of bird feeding devices intended for overhead installation.

2. Description of the Prior Art

Bird feeding devices, as generally employed on residential properties, are usually positioned at elevated locations above the ground as by way of pendant attachment to a tree or support upon a pole. The feeder device is generally comprised of a housing for protectively holding a quantity of particulate bird feed material, said housing having apertures for dispensing the feed in a reasonably controlled manner, and usually at least one horizontally protruding perch to serve as a roost for birds.

The re-filling of the feeder housing with bird feed often requires the use of a climbing device such as a step stool or ladder to remove the feeder from its elevated position and then replace it reloaded with bird feed. Such procedure involves inconvenience and risk of accident, and further involves the need to own and store a ladder or step stool.

There has been earlier disclosed the use of pulley devices and similar mechanical innovations to facilitate the raising and lowering of bird feeders. However, such devices involve installation challenges and are susceptible to malfunction or deterioration due to weathering factors.

Accordingly, it is an object of the present invention to provide a bird feeder apparatus designed for overhead installation which obviates the need for climbing so as to service the apparatus for the purpose of re-filling it with particulate bird feed material.

It is another object of this invention to provide a bird feeder apparatus as in the foregoing object which is resistant to malfunction, easy to service and amenable to low cost manufacture.

These objects and other objects and advantages of the invention will be apparent from the following description.

SUMMARY OF THE INVENTION

The above and other beneficial objects and advantages are accomplished in accordance with the present invention by a bird feeder comprised of:

1. a dispensing component comprised of:
   a) a housing adapted to confine a quantity of particulate bird feed material with reasonable protection from the effects of rainwater,
   b) release aperture means associated with said housing for permitting controlled removal of said feed material by birds,
   c) a refill port located in an upper region of said housing, and
   d) adjustable closure means associated with said refill port, and
2. a refilling component comprised of:
   a) a compartment for holding an amount of said particulate bird feed, and comprised of upper and lower portions with intervening circuitous sidewall structure having a downwardly convergent region,
   b) a hollow stem downwardly emergent from said convergent region as a continuous integral extension thereof and having a downwardly tapered size and shape adapted to penetrate the refill port of said housing, and
   c) flapper valve means interactive with said stem portion and biased in a normally closed state and adapted to automatically move in opposition to said biasing effect to an open state upon contact with said refill port to permit gravity flow of said feed into said housing, and
   d) an elongated handling staff extending between a lower extremity and an upper extremity pivotally joined to an upper portion of said compartment.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side perspective view of an embodiment of the refilling component of the bird feeder apparatus of the present invention.

FIG. 2 is a front perspective view of an embodiment of a dispensing component interactive with the refilling component of FIG. 1.

FIG. 5 is a front and side perspective view showing the refilling component of FIG. 1 in the process of interacting with the dispensing component of FIG. 2.

DESCRIPTION OF THE PREFERRED EMBODIMENT

Figure 4:
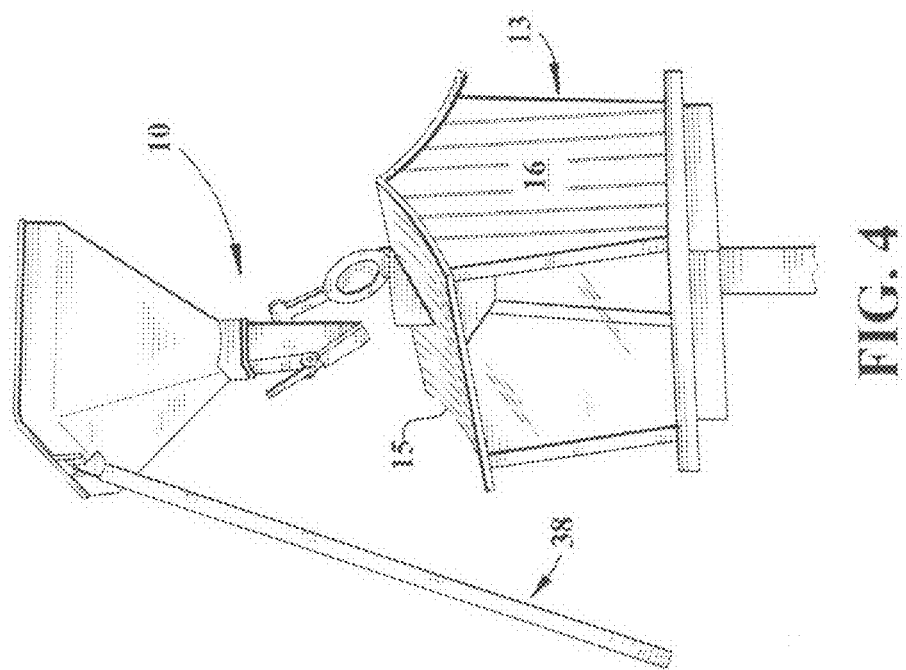
FIG. 4 shows how the refilling component can manipulate an adjustable closure means associated with the refill port of said dispensing component.
Figure 3:
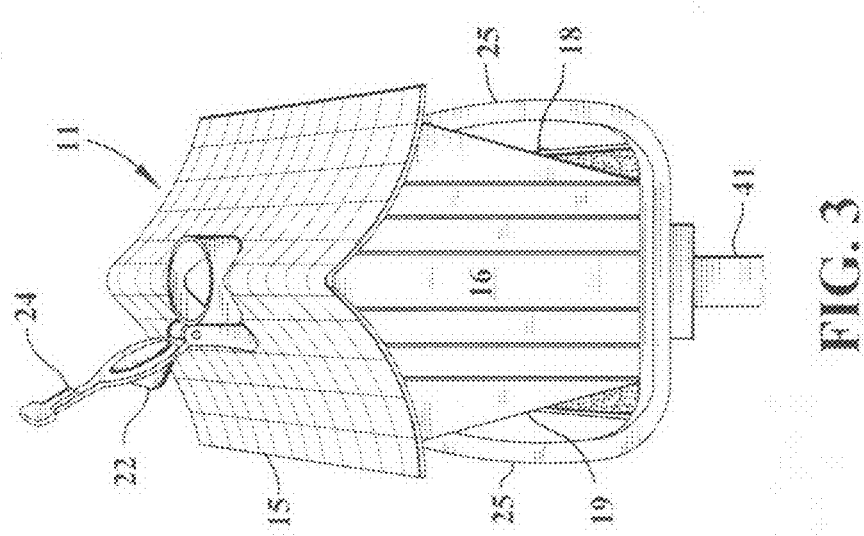
FIG. 3 is a top and side perspective view of the dispensing component of FIG. 2.

Referring now to FIGS. 1-5, an embodiment of the bird feeder apparatus 10 of the present invention is shown comprised of dispensing component 11 and refilling component 12.

Dispensing component 11 includes a housing 13 adapted to confine a quantity of particulate bird feed material 14 with reasonable protection from the effects of rainwater. Housing 13 of the exemplified embodiment is comprised of a roof member 15, opposed sidewalls 16, floor panel 17 and opposed front and rear walls 18 and 19, respectively. The several parts of said housing are preferably fabricated of plastic materials which may be transparent. Release aperture means are provided in the form of horizontally elongated slots 20 adjacent floor 17 for permitting controlled removal of said feed material by birds. A refill port 21 is positioned in roof member 15. Adjustable closure means in the form of lid 22 is attached by pivot means 23 to port 21. A manipulating arm 24 extends from lid 22 as a continuous extension thereof. Roosting rails 25 extend outwardly from floor 17 to enable birds to perch while feeding.

Refilling component 12 includes a compartment 26 for holding an amount of said bird feed and comprised of upper and lower portions 27 and 28, respectively with intervening circuitous sidewall structure 29 having a region 30 which is downwardly convergent upon a vertical center axis 31. In the exemplified embodiment, region 30 is formed of four panel portions which provide a rectangular cross-sectional orthogonal to axis 31.

A hollow stem 32 is downwardly emergent from region 30 as a continuous integral extension thereof and having a downwardly tapered cross-sectional size and shape adapted to penetrate refill port 21 of housing 13. Valve means 34 is interactive with stem 32 and constructed so as to be biased to a normally closed state which prevents downward passage of bird feed from compartment 26 through said stem.

The exemplified valve means 34 is comprised of elongated panel 35 joined at about mid-length to stem 32 by horizontally oriented pivot means 36. Contact portion 40 of panel 35, located above pivot means 36, is forced outwardly from axis 31 by clothespin-type spring 37 secured by said pivot means. The effect of such action is to bias the portion of panel 35 below pivot means 36 into a position of closure of stem 32. An elongated rigid handling staff 38, which may be 2-6 feet long, extends between a lower extremity and a top extremity 39 pivotably joined to upper portion 27 of compartment 26.

In operation, the refilling component is lifted by staff 38 to a position above housing 13 whereby, as best shown in FIG. 4, stem 32 is caused to contact manipulating arm 24 so as to pivot lid 22 to the open state of port 21. Refilling component 12 is then axially oriented directly above port 21 and lowered. Stem 32 is thereby caused to penetrate port 21 to an extent whereby the inside perimeter of the port abuts against contact portion 40 of panel 35. Such action, as best shown in FIG. 5, pushes contact portion 40 of valve means 34 toward axis 31 against the biasing effect of spring 37, thereby opening stem 32 and allowing bird feed to fall by gravity effect into housing 13.

Although the exemplified dispensing component is shown supported by a post 41, it may also be pendently supported from a tree. Both dispensing component 11 and refilling component 12 may be of varied size and shape. Said release aperture means associated with housing 13 may consist of a series of apertures of varied size and location.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described our invention, what is claimed is:
1. A bird feeder comprised of:
   a. a dispensing component comprised of:
      1) a housing adapted to confine a quantity of particulate bird feed material with reasonable protection from the effects of rainwater,
      2) release aperture means associated with said housing for permitting controlled removal of said feed material by birds,
      3) a refill port located in an upper region of said housing, and
      4) adjustable closure means associated with said refill port, and
   b. a refilling component comprised of:
      1) a compartment for holding an amount of said particulate bird feed, and comprised of upper and lower portions with intervening circuitous sidewall structure having a downwardly convergent region,
      2) a hollow stem downwardly emergent from said convergent region as a continuous integral extension thereof and having a downwardly tapered size and shape adapted to penetrate the refill port of said housing, and
      3) flapper valve means interactive with said stem portion and biased in a normally closed state and adapted to automatically move in opposition to said biasing effect to an open state upon contact with said refill port to permit gravity flow of said feed into said housing, and
      4) an elongated handling staff extending between a lower extremity and an upper extremity pivotally joined to the upper portion of said compartment.

2. The bird feeder of claim 1 wherein said housing is comprised of a roof member, opposed side walls, a floor panel and opposed front and rear walls.

3. The bird feeder of claim 2 wherein said release aperture means is a horizontally elongated slot adjacent said floor panel.

4. The bird feeder of claim 3 wherein said refill port is positioned in said roof member.

5. The bird feeder of claim 4 wherein said closure means is attached by pivot means to said port, and is provided with a manipulating arm.

6. The bird feeder of claim 3 wherein roosting rails extend outwardly from said floor to enable birds to perch while feeding.

7. The bird feeder of claim 1 wherein said downwardly convergent region is formed of four panels configured to provide a rectangular horizontal cross-action.

8. The bird feeder of claim 1 wherein said valve means is comprised of an elongated panel joined at about mid-length thereof to said stem by horizontally oriented pivot means.

9. The bird feeder of claim 8 wherein said pivot means secures a clothespin-type spring which biases the portion of said elongated panel below said pivot means into a position of closure of said hollow stem.

10. The bird feeder of claim 9 wherein said elongated panel has, above said pivot means, a portion which is forced inwardly when said stem enters said refill port, thereby acting against the biasing effect of said spring to open said stem and allow bird feed to fall by gravity into said dispensing component.

* * * * *